United States Patent
Irisawa (10) Patent No.: US 7,581,040 B2
(45) Date of Patent: Aug. 25, 2009

(54) INTERFACE CIRCUIT, SYSTEM DEVICE USING THE INTERFACE CIRCUIT, AND DATA INTERFACE METHOD, THE INTERFACE CIRCUIT PERFORMING DATA TRANSFER BETWEEN A HOST AND A PERIPHERAL DEVICE

(75) Inventor: Tatsuya Irisawa, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 11/711,648

(22) Filed: Feb. 28, 2007

(65) Prior Publication Data
US 2007/0208889 A1 Sep. 6, 2007

(30) Foreign Application Priority Data
Mar. 2, 2006 (JP) .............................. 2006-055933

(51) Int. Cl.
*G06F 13/00* (2006.01)
(52) U.S. Cl. ........................... 710/33; 710/300; 710/306
(58) Field of Classification Search ......... 710/300–315, 710/8–19, 107–112, 31–33; 235/438–445; 711/100–103, 111–115; 365/189.03–189.05, 365/185.11, 185.33
See application file for complete search history.

(56) References Cited

U.S. PATENT DOCUMENTS

| | | | | |
|---|---|---|---|---|
| 5,761,697 A | * | 6/1998 | Curry et al. ................. | 711/100 |
| 5,790,890 A | * | 8/1998 | Mirov et al. ................. | 710/15 |
| 5,948,077 A | * | 9/1999 | Choi et al. ................... | 710/9 |
| 5,974,474 A | * | 10/1999 | Furner et al. ................ | 710/8 |
| 6,859,856 B2 | * | 2/2005 | Piau et al. ................... | 711/103 |
| 7,136,950 B2 | * | 11/2006 | Mowery et al. .............. | 710/301 |
| 7,191,270 B2 | * | 3/2007 | Oh et al. ..................... | 710/109 |
| 7,237,052 B2 | * | 6/2007 | Okamoto et al. ............ | 710/301 |
| 2003/0067814 A1 | | 4/2003 | Piau et al. | |
| 2005/0041459 A1 | * | 2/2005 | McDonald ................... | 365/154 |
| 2005/0258243 A1 | * | 11/2005 | Hsieh ......................... | 235/441 |
| 2007/0170255 A1 | * | 7/2007 | Yoshida ...................... | 235/439 |

FOREIGN PATENT DOCUMENTS

| JP | 2005-157760 | 6/2005 |
|---|---|---|
| JP | 2006-209643 | 8/2006 |

* cited by examiner

*Primary Examiner*—Raymond N Phan
(74) *Attorney, Agent, or Firm*—Dickstein Shapiro LLP (57) ABSTRACT

An interface circuit performing data transfer between a host device and a peripheral device, which includes at least two interface blocks; and a card identification circuit configured to access the peripheral device to determine a transfer mode of the peripheral device, wherein the interface circuit determines a mode of data transfer between the host device and the peripheral device on the basis of the transfer mode of the peripheral device. A system device including a host device; a peripheral device; and the interface circuit. A data interface method for performing data transfer between a host device and a peripheral device, including accessing the peripheral device to determine a transfer mode of the peripheral device; and determining a mode of data transfer between the host device and the peripheral device according to the transfer mode of the peripheral device.

18 Claims, 7 Drawing Sheets

INTERFACE CIRCUIT, SYSTEM DEVICE USING THE INTERFACE CIRCUIT, AND DATA INTERFACE METHOD, THE INTERFACE CIRCUIT PERFORMING DATA TRANSFER BETWEEN A HOST AND A PERIPHERAL DEVICE

BACKGROUND OF THE INVENTION

1. Field of the Invention

The present invention relates to an interface circuit, and more particularly to an interface circuit for performing data transfer between a host device (such as personal computers and printers) and a peripheral device (such as memory cards). In addition, the present invention also relates to a system device using the interface circuit and a data interface method.

2. Discussion of the Background

In recent years, memory cards including a flash memory is used as data storage and transmission devices for digital equipments such as portable phones, digital cameras, personal computers and printers.

Specific examples of such memory cards include PC CARD (trademark) and COMPACT FLASHCARD (CF CARD) (trademark). With respect to CF CARD, which is smaller in size than PC CARD, the below-mentioned PC CARD adaptors have been developed and commercialized so that CF CARD can be used for system devices having a PC CARD slot.

Specific examples of the data transfer mode for CF CARD include three modes, i.e., a memory mode, an I/O mode and a True IDE mode at the present time. Among these modes, the True IDE mode has been used for high-access-speed transmission because Card Bus has been developed and commercialized. Thus, it is possible for the True IDE mode to perform data transfer at a higher speed than in the case of using other modes.

Figure 1:
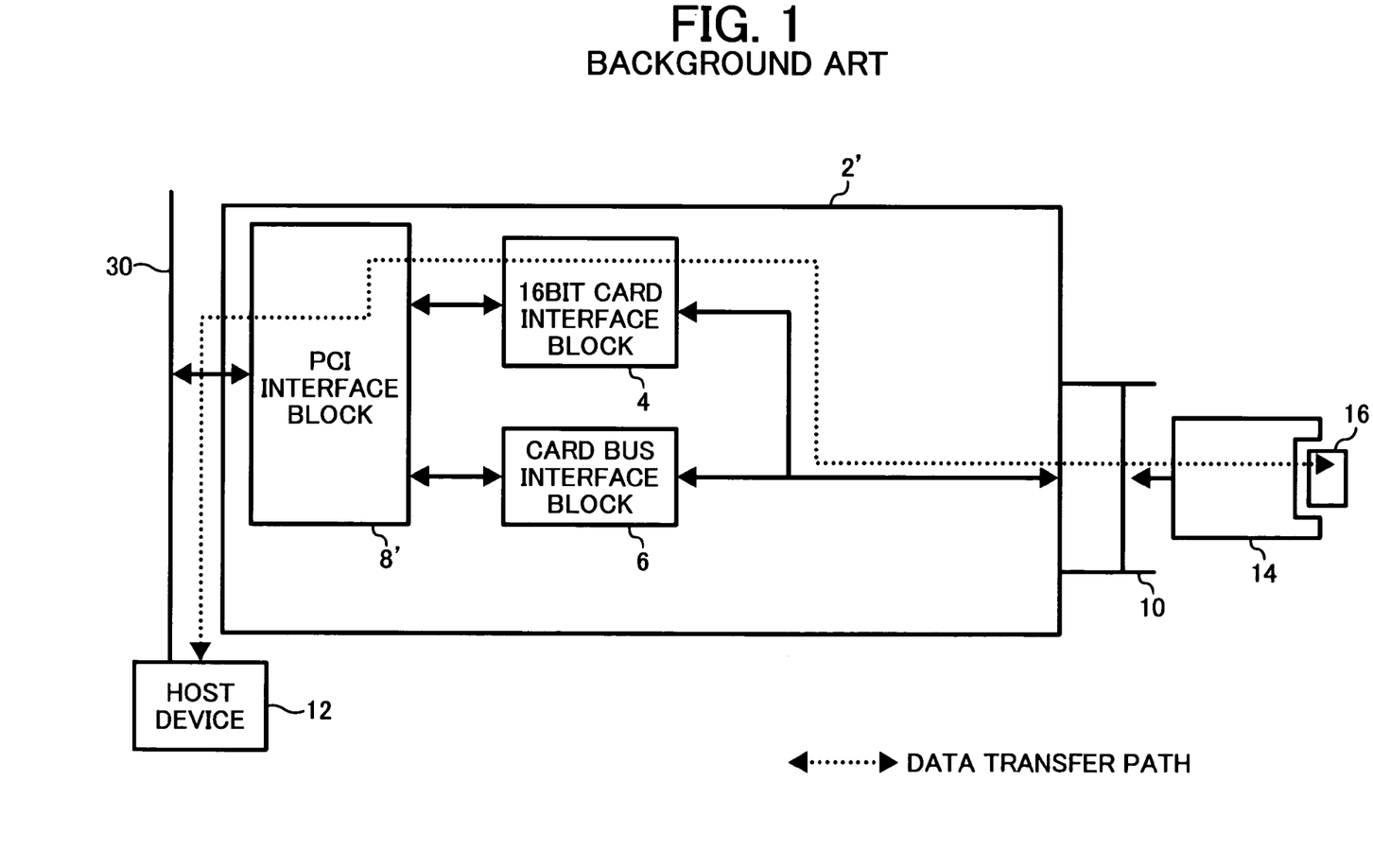
FIG. 1 is a block diagram illustrating a background system device including a PC CARD interface, which uses a CF card.

An example of conventional systems including a PC CARD interface using CF CARD will be explained by reference to FIG. 1. FIG. 1 is a block diagram illustrating a background system device including a PC CARD interface.

Referring to FIG. 1, a CF CARD 16 is inserted into a 16-bit PC CARD adaptor card 14, and the 16-bit PC CARD adaptor card 14 is attached to a PC CARD connector 10 provided on the background system.

The PC CARD connector 10 is provided on a PC CARD controller 2' in the conventional system. The PC CARD controller 2' communicates with a host device 12, which is a main device of the system, via a PCI bus 30 to transmit and receive data to or from the host device 12.

When the 16-bit PC CARD adaptor card 14, into which the CF CARD 16 has been inserted, is attached to the PC CARD connector 10, the PC CARD controller 2' recognizes that a 16-bit PC CARD 16 has been attached, and transmits the information (i.e., attachment of a 16-bit PC CARD 16) to the host device 12. Hereinafter, the host device 12 accesses the PC CARD controller 2' using a 16-bit PC CARD transfer mode (i.e., a 16-bit PC CARD ATA mode).

In this regard, the 16-bit PC CARD ATA mode is compatible with a memory mode and an I/O mode of CF CARD. Therefore, the PC CARD controller 2' can transmit and receive data to or from CF CARD without using an interface circuit. Therefore, data transfer between the host device 12 and CF CARD 16 which is inserted into the 16-bit PC CARD adaptor card 14 is performed via the PCI bus 30, a PCI interface block 8' and a 16-bit card interface block 4 as illustrated by a dotted line in FIG. 1.

The memory mode and I/O mode of CF CARDs is called a PC CARD ATA mode. The data transfer between a CF CARD and a system device is one of most popular data transfer.

However, as mentioned above, there are some CF CARDs having a True IDE mode capable of performing high speed data transfer. Specifically, almost all CF CARDs, which have been developed and commercialized recently, have a True IDE mode. However, when a card having a True IDE mode is used for the conventional system illustrated in FIG. 1, a problem which occurs is that only the data transfer in a PC CARD ATA mode can be available, namely, high speed data transfer cannot be performed.

Figure 2:
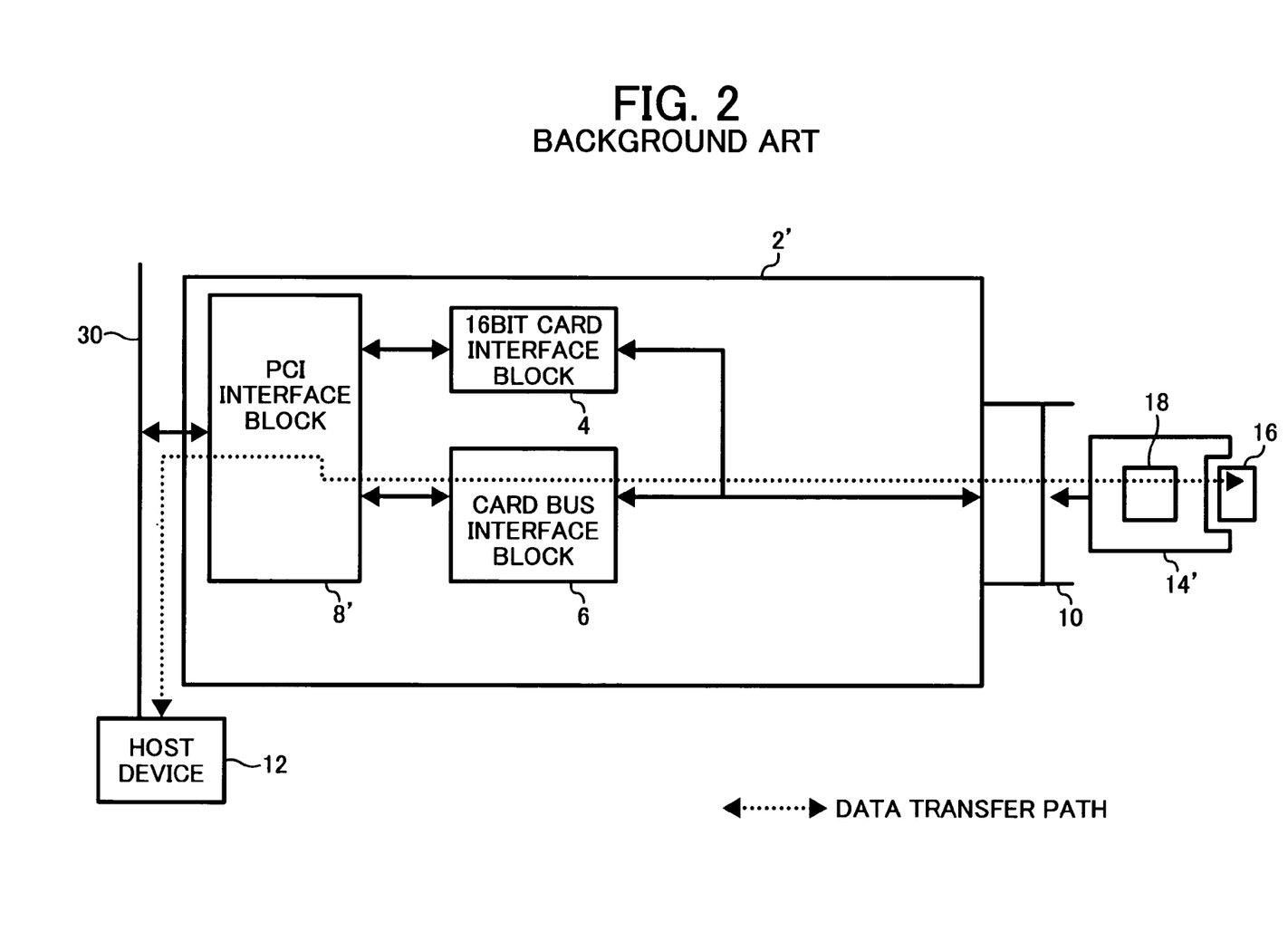
FIG. 2 is a block diagram illustrating another background system device including a PC CARD interface, which uses a CF card.

Another example of conventional systems including a PC CARD interface using CF CARD will be explained by reference to FIG. 2. FIG. 2 is a block diagram illustrating another background system device including a PC CARD interface. The system device illustrated in FIG. 2 has a Card Bus card adaptor card 14' is used instead of the 16-bit PC CARD adaptor card 14.

Referring to FIG. 2, the CF CARD 16 is inserted into the Card Bus card adaptor 14' and the Card Bus card adaptor 14' is attached to the PC CARD connector 10 provided on the system device. In this case, the PC CARD controller 2' recognizes that a Card Bus card is attached, and transmits the information (i.e., attachment of a Card bus card) to the host device 12. Hereinafter, the host device 12 accesses the PC CARD controller 2' using a Card Bus card transfer mode.

In this regard, the Card Bus card transfer mode is not compatible with any of the transfer modes of CF CARD. Therefore, it is necessary to convert the signal to a signal which can be used for any one of the CF CARD transfer modes. The background Card Bus card type adaptor card 14' illustrated in FIG. 2 includes an IDE interface block 18 therein to use a high speed transfer mode, i.e., the True IDE mode. Therefore, the CF CARD 16 performs data transfer using the True IDE mode.

Therefore, data transfer between the host device 12 and the CF CARD 16 which is inserted into the Card Bus card adaptor card 14' is performed via the PCI bus 30, the PCI interface block 8' and a Card Bus card interface block 6 as illustrated by a dotted line in FIG. 2.

However, all of existing CF CARDs are not compatible with the True IDE mode. For example, CF CARD-shaped modem cards which are used as modems are compatible with only the I/O mode. When such a card is inserted into the Card Bus card adaptor card 14' data transfer between a system device and the card (i.e., modem card) cannot be performed.

Published unexamined Japanese patent application No. 2005-157760 discloses an information processing device, a PC CARD control circuit and a control method concerning control of mode of PC CARD. In the publication, the mode is controlled by a CPU.

Because of these reasons, a need exists for a technique such that a CF CARD compatible with the True IDE mode is operated using the True IDE mode while a CF CARD not compatible with the True IDE mode is operated in the PC CARD ATA mode in data transfer between a system device including a PC CARD controller and a PC CARD connector, and a CF CARD inserted into a PC CARD type adaptor.

SUMMARY OF THE INVENTION

As one aspect of the present invention, an interface circuit is to provide which at least two interface blocks configured to perform data transfer between a host device and a peripheral device; and a card identification circuit configured to access the peripheral device to determine the transfer mode of the peripheral device, wherein the interface circuit determines the mode of data transfer on the basis of the transfer mode of the peripheral device.

As another aspect of the present invention, a system device is provided which includes a host device, a peripheral device and the above-mentioned interface circuit, which performs data transfer between the host device and the peripheral device.

As yet another aspect of the present invention, a data interface method for performing data transfer between a host device and a peripheral equipment is provided which includes identifying a transfer mode of the peripheral device and then determining the mode for data transfer on the basis of the transfer mode of the peripheral device.

These and other objects, features and advantages of the present invention will become apparent upon consideration of the following description of the preferred embodiments of the present invention taken in conjunction with the accompanying drawings.

DETAILED DESCRIPTION OF THE INVENTION

Generally the present invention provides an interface circuit performing data transfer between a host device and a peripheral device, which includes at least two interface block configured to perform the data transfer; and a card identification circuit configured to access the peripheral device to determine a transfer mode of the peripheral device, wherein the interface circuit determines the mode of data transfer between the host device and the peripheral device on the basis of the transfer mode of the peripheral device.

In the interface circuit, when the peripheral device is compatible with a first data transfer mode, the interface circuit performs the data transfer using the first data transfer mode, and when the peripheral device is not compatible with the first data transfer mode, the interface circuit performing the data transfer using a second data transfer mode.

The peripheral device is, for example, a first memory card. In addition, the first memory card is, for example, a CF CARD, the first transfer mode is, for example, a True IDE mode, and the second transfer mode is, for example, a PC CARD ATA mode.

A connector can be provided on the interface circuit to be connected with a second memory card, wherein the first memory card is connected with the connector via an adaptor card to perform the data transfer in a transfer mode in which the second memory card is operable.

When the first memory card, which is connected with the connector via the adaptor card, is compatible with the first transfer mode, the interface circuit informs the host device that the adaptor card is a memory card operable in a third transfer mode in which the second memory card is operable and which is compatible with the first transfer mode. When the first memory card is not compatible with the first transfer mode, the interface circuit informs the host device that the adaptor card is a memory card operable in a fourth transfer mode in which the second memory card is operable.

For example, the first memory card is a CF CARD, the second memory card is a PC CARD, the first transfer mode for the first memory is a True IDE mode, the memory card operable in the third transfer mode is a Card Bus PC card, the memory card operable in the fourth transfer mode is a 16-bit PC CARD, and the adaptor is a 16-bit PC CARD adaptor card.

Alternatively, the first memory card may be a CF CARD, the second memory card may be a PC CARD and the adaptor card may be a 16-bit PC CARD adaptor card.

It is preferable that the data transfer is performed via three or more interface blocks, which are preferably a PCI interface block, a Card Bus interface block, and an IDE interface block.

It is preferable that the interface blocks control the method of connection between the host device and the peripheral device according to the transfer mode identified by the identification circuit. In addition, the method of connection with the host device preferably includes at least a Direct Memory Access (DMA) transfer method.

The system device of the present invention includes a host device; a peripheral device; and the interface circuit mentioned above, which is configured to perform data transfer between the host device and the peripheral device.

The data interface method of the present invention for performing data transfer between a host device and a peripheral device, includes the steps of accessing the peripheral device to determine a transfer mode of the peripheral device; determining a mode of data transfer between the host device and the peripheral device according to the transfer mode of the peripheral device; and performing data transfer between the host device and the peripheral device according to the mode of data transfer.

In the determining step, when the peripheral device is compatible with a first data transfer mode, the first data transfer mode is used. When the peripheral device is not compatible with the first data transfer mode, a second data transfer mode is used.

The peripheral device includes, for example, a first memory card, or a first memory card and a second memory card. When a first memory card and a second memory card are used as the peripheral device, the first memory card is connected with the host device via an adaptor card, and the accessing step and the data transfer performing step are performed via the adaptor card.

The data interface method can further include the step of informing the host device that the adaptor card is a memory card operable in a third transfer mode in which the second memory card is operable and which is compatible with the first transfer mode when the first memory card, which is connected with the connector via the adaptor card, is compatible with the first transfer mode and that the adaptor card is a memory card operable in a fourth transfer mode in which the second memory card is operable when the first memory card, which is connected with the connector via the adaptor card, is not compatible with the first transfer mode.

Next, the interface circuit, system device and interface method of the present invention will be explained by reference to drawings.

Figure 3:
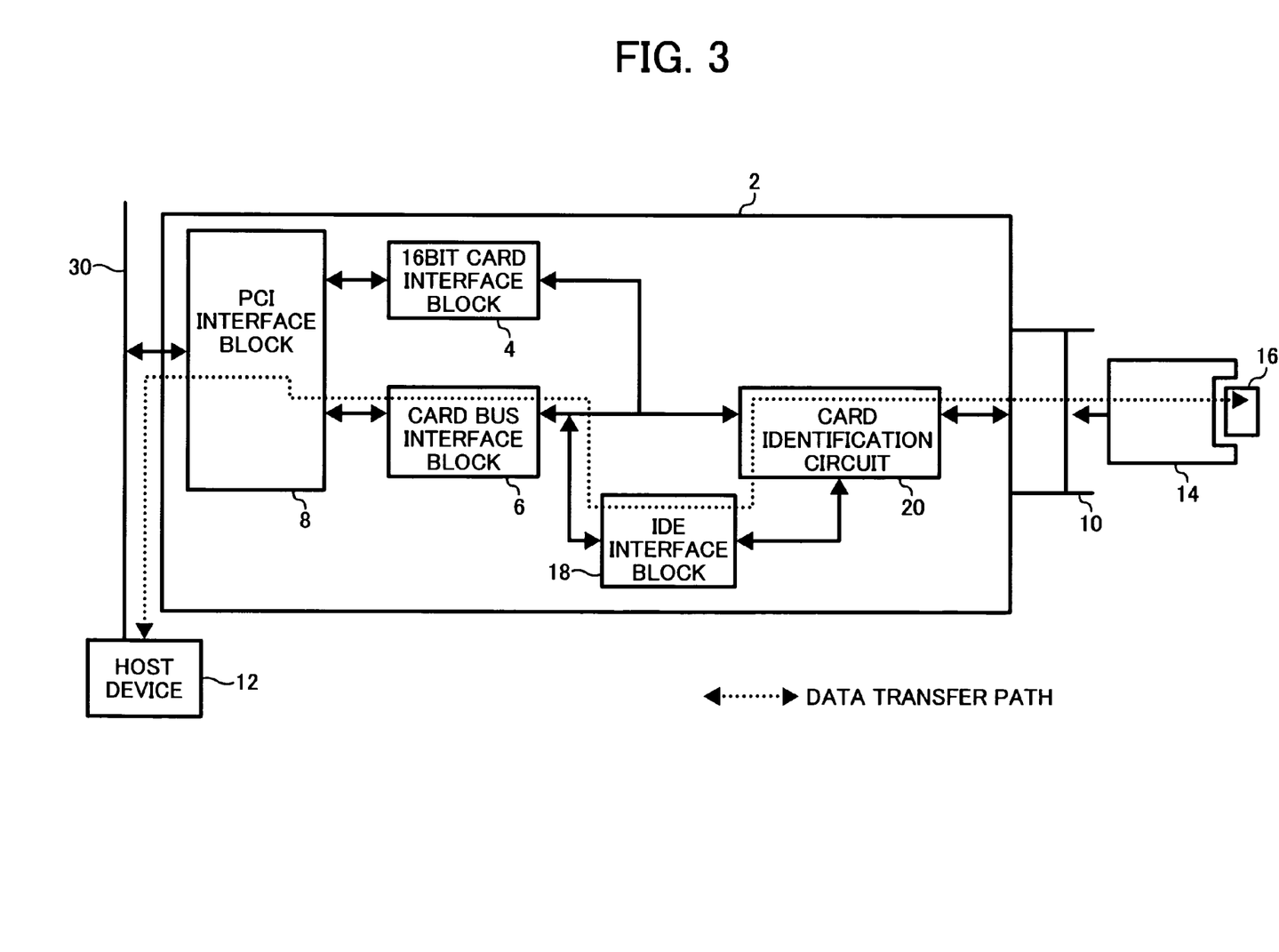
FIGS. 3 and 4 are block diagrams illustrating an example of the system device of the present invention.
Figure 4:
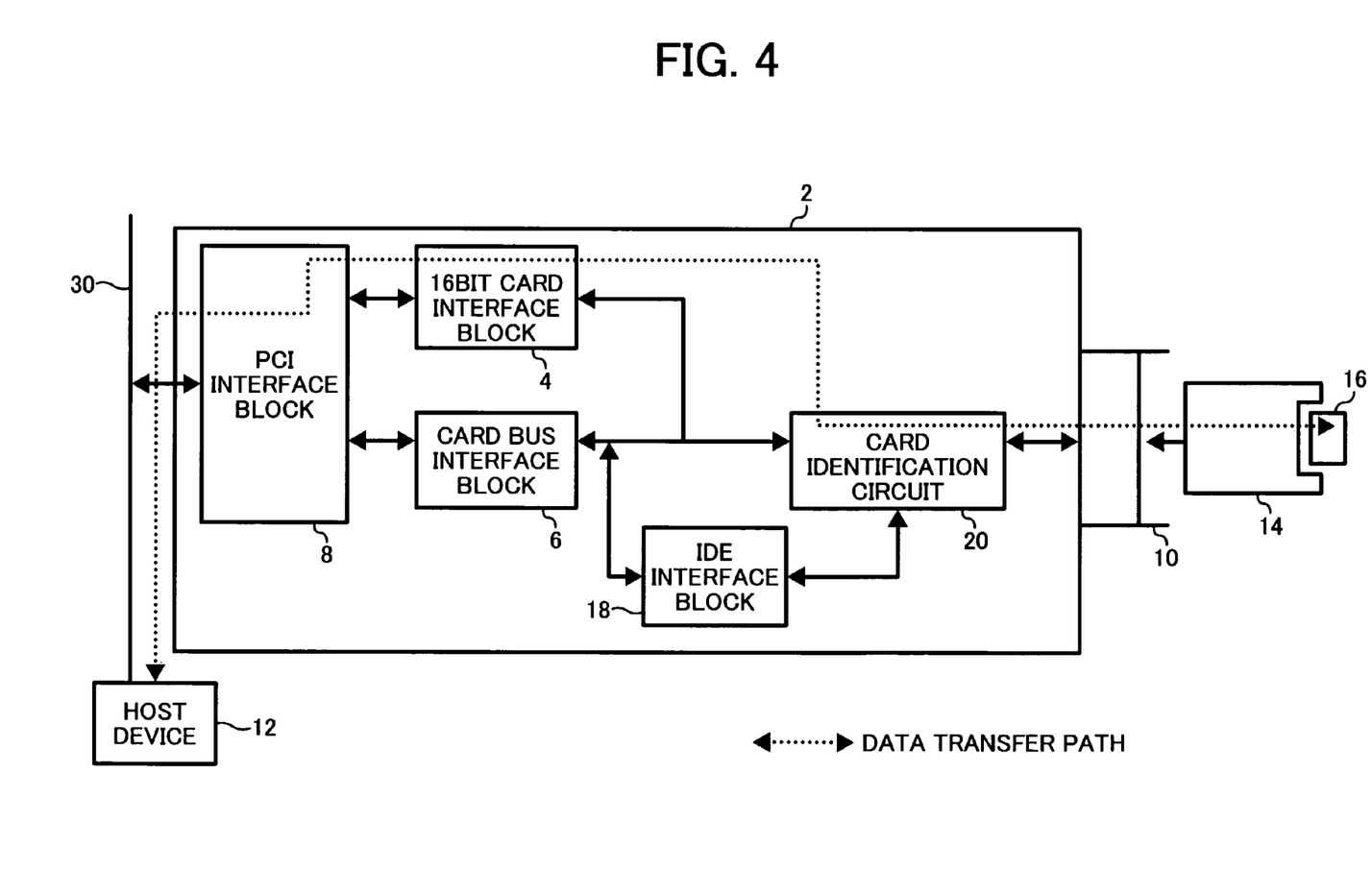

FIGS. 3 and 4 are block diagrams illustrating an example of the system device of the present invention.

Referring to FIGS. 3 and 4, a system device including a PC CARD interface includes a PC CARD controller 2 and a host device 12 as main components. The PC CARD controller 2 is connected with the host device 12 using a PCI bus 30. The PC CARD controller 2 has a PC CARD connector 10 to which an adaptor card or a PC CARD is to be attached. In addition, as illustrated in FIGS. 3 and 4, the PC CARD controller 2 includes a PCI interface block 8, a 16-bit card interface block 4, a Card Bus interface block 6, an IDE interface block 18 and a card identification circuit 20 as main components.

Unlike the conventional system devices illustrated in FIGS. 1 and 2, the PC CARD controller 2 of the system device illustrated in FIGS. 3 and 4 includes the IDE interface block 18 and the card identification circuit 20. The operation of the PC CARD controller 2 is as follows.

When a PC CARD adaptor card 14 to which the CF CARD 16 has been attached is inserted into the PC CARD connector 10, the PC CARD controller 2 checks whether the inserted card is a 16-bit PC CARD (or a 16-bit PC CARD adaptor card).

When the inserted card is a 16-bit PC CARD (or a 16-bit PC CARD adaptor card), the card identification circuit 20 accesses a CIS (Card Information Structure) tuple of the 16-bit PC CARD (i.e., the CF CARD 16 in FIG. 3) to check the transfer mode thereof.

When the CF CARD 16 is compatible with a True IDE mode, the PC CARD controller 2 informs the host device 12 that the a Card Bus card is inserted. Hereinafter the host device 12 accesses the PC CARD controller 2 using the Card Bus card transfer mode. The PC CARD controller converts the Card Bus card transfer mode to the True IDE mode at the IDE interface block 18. Thereby it becomes possible to transmit data to the CF CARD using the True IDE mode as illustrated in FIG. 3.

When the CF CARD 14 inserted into the 16-bit PC CARD adaptor card 14 is not compatible with the True IDE mode, the CF CARD 16 is operated as a 16-bit PC CARD using a PC CARD ATA mode as illustrated in FIG. 4 like the background system device illustrated in FIG. 1.

Next, (1) the card identification operation, (2) the data transfer operation (writing) and (3) the data transfer (reading) operation of the PC CARD controller 2 of the system device illustrated in FIGS. 3 and 4 will be explained by reference to FIGS. 5, 6 and 7.

Figure 5:
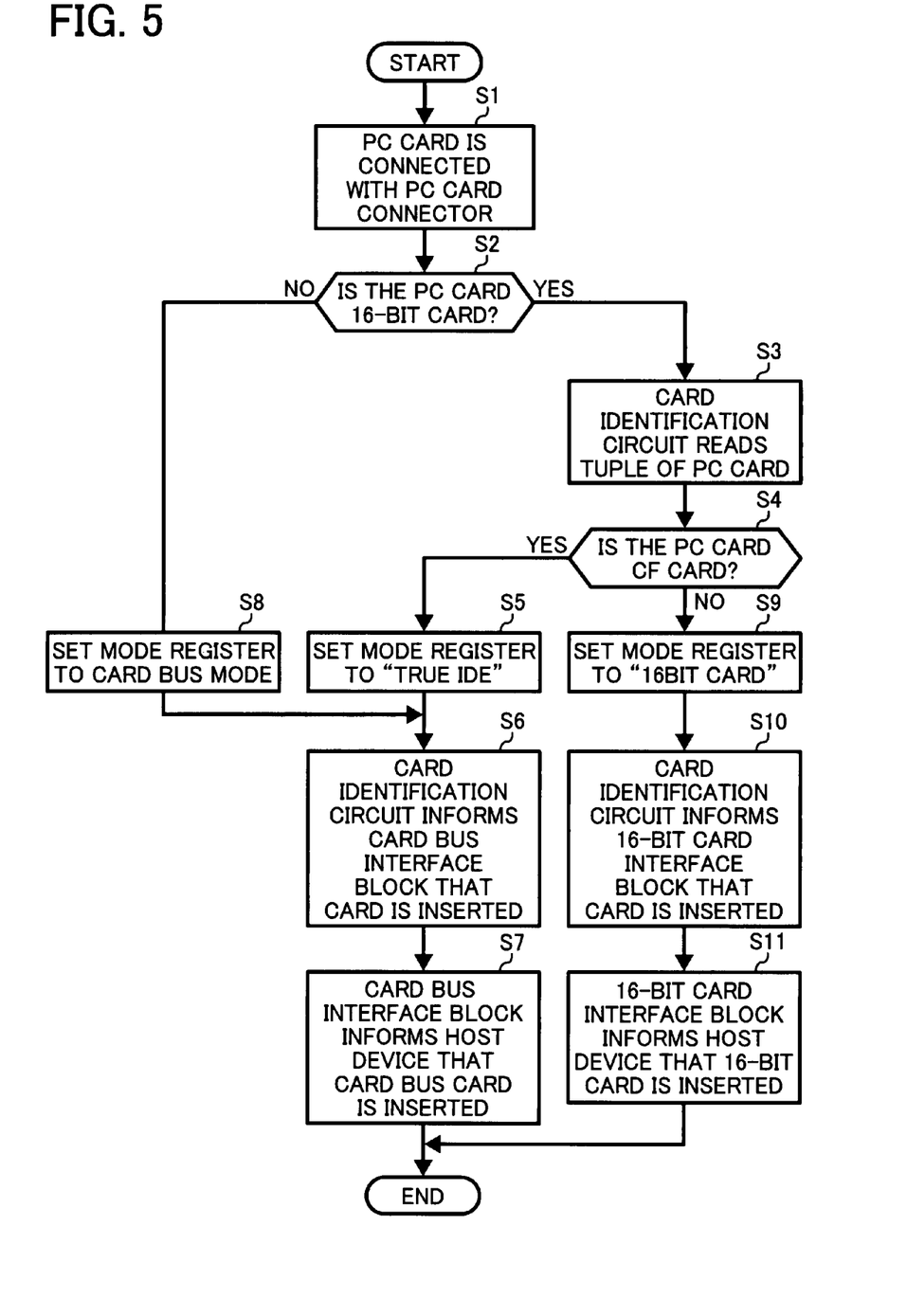
FIG. 5 is a flowchart illustrating the card identification operation of the card controller used for the system device illustrated in FIGS. 3 and 4.

FIG. 5 is a flowchart illustrating (1) the card identification operation of the card controller 2 used for the first example of the system device.

When a PC CARD or a PC CARD adaptor card is connected with the PC CARD connector 10 (step S1), it is determined whether the inserted card is a 16-bit PC CARD adaptor card (step S2). When the card is not a 16-bit PC CARD adaptor card (NO in step S2), a MODE register, which is a temporary storage portion storing the transfer mode, is set to a "Card Bus" mode (step S8), and the operation proceeds to step S6 (Step 6 and the following steps will be explained below).

When the card is a 16-bit PC CARD adaptor card (YES in step S2), the card identification circuit 20 reads the CIS tuple of the PC CARD or PC CARD adaptor card (step S3). When the connected card is a card compatible with the True IDE mode (YES in step S4), the MODE register is set to the "True IDE" mode (step S5). Then the card identification circuit 20 informs the Card Bus interface block 6 that a card is inserted (step S6), and the Card Bus interface block 6 informs the host device 12 that a Card Bus card is inserted (step S7).

In step S4, when the connected card is not a card compatible with the True IDE mode (NO in step S4), the MODE register is set to a "16-bit card" mode (step S9). Then the card identification circuit 20 informs the 16-bit card interface block 4 that a card is inserted (step S10), and the 16-bit card interface block 4 informs the host device 12 that a 16-bit PC CARD is inserted operation (reading operation) of the card controller 2 used for the first example of the system device.

At first, the PC CARD or the CF CARD inserted into the PC CARD adaptor card transmits the data to be read to the PC CARD controller 2 (step S31), and the mode of the MODE register is checked shortly after the data transfer (step S32).

When the mode of the MODE register is the "Card Bus" mode, the Card Bus interface block 6 receives the data sent from the PC CARD (step S33). The Card Bus interface block 6 transmits the data to the PCI interface block 8 (step S34). The PCI interface block 8 transmits the data to the host device 12 (step S40). Thus, the host device 12 reads the data.

When the mode of the MODE register is the "True IDE" mode, the IDE interface block 18 receives the data from the CF CARD 16 inserted into the PC CARD adaptor card (step S35) The IDE interface block 18 transmits the data to the Card Bus interface block 6 (step S36). The Card Bus interface block 6 transmits the data to the PCI interface block 8 (step S37). The PCI interface block 8 transmits the data to the host device 12 (step S40). Thus, the host device 12 reads the data.

The mode of the MODE register is the "16-bit card" mode, the 16-bit card interface block 4 receives the data from the PC CARD or the PC CARD adaptor card (step S38). The 16-bit card interface block 4 transmits the data to the PCI interface block 8 (step S39). The PCI interface block 8 transmits the data to the host device 12 (step S40). Thus, the host device 12 reads the data. (step S11).

Figure 6:
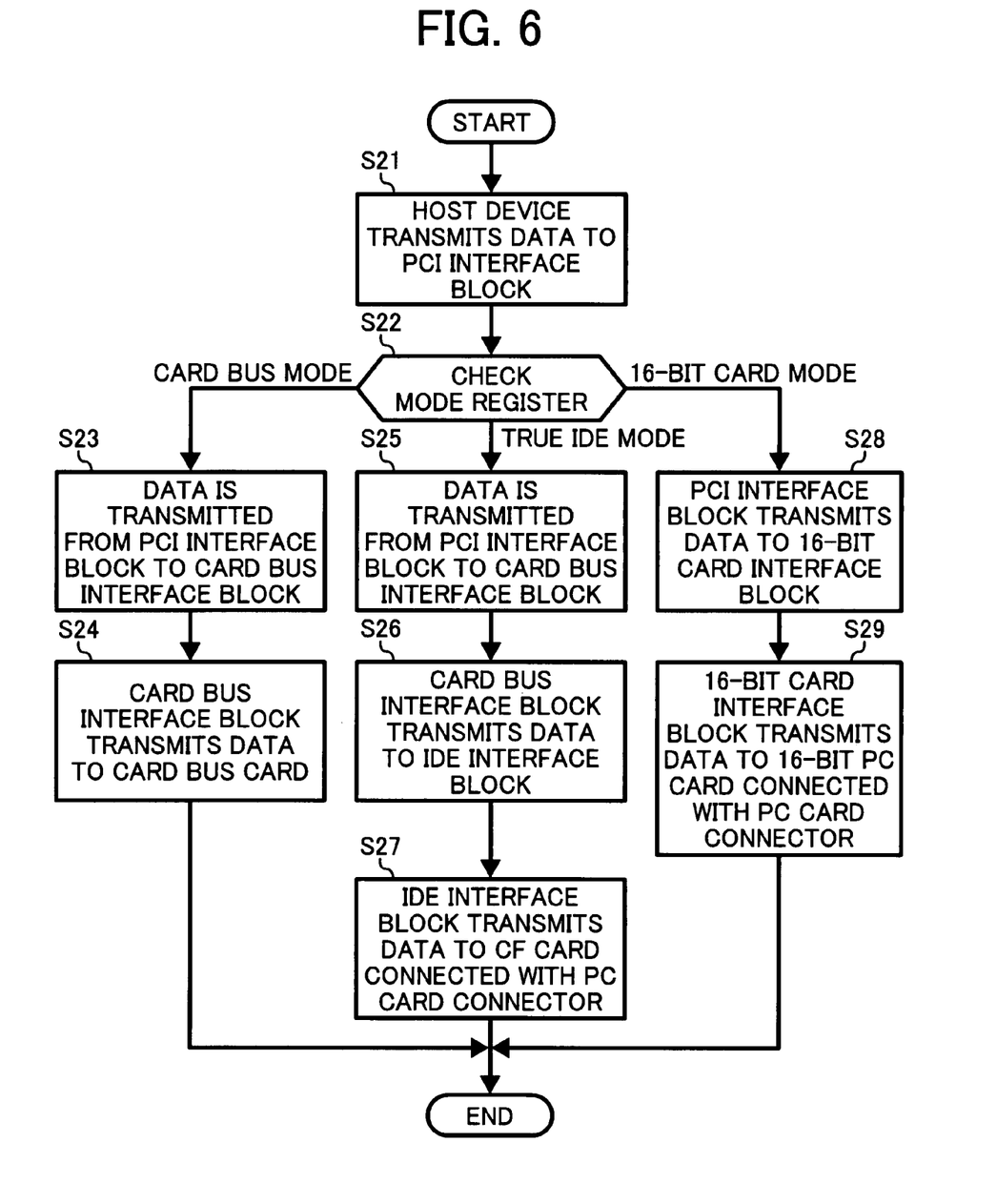
FIG. 6 is a flowchart illustrating the data transfer operation (reading operation) of the card controller used for the system device illustrated in FIGS. 3 and 4.

FIG. 6 is a flowchart illustrating (2) the data transfer operation (writing operation) of the card controller 2 used for the first example of the system device.

At first, the host device 12 transmits the data to be written in the PCI interface block 4 (step S21), and the MODE register is checked shortly after the data transfer (step S22). When the mode of the MODE register is the "Card Bus" mode, the data is transmitted from the PCI interface block 8 to the Card Bus interface block 6 (step S23). The Card Bus interface block 6 transmits the data to the Card Bus card which is connected with the PC CARD connector 10 (step S24).

When the mode of the MODE register is the "True IDE" mode, the data is transmitted from the PCI interface block 8 to the Card Bus interface block 6 (step S25). In this case, the Card Bus interface block 6 transmits the data to the IDE interface block 18 (step S26) to perform data exchange so that the data can be transmitted in the True IDE mode. The IDE interface block 18 transmits the data to the CF CARD 16 which is connected with the PC CARD connector (step S27).

When the mode of the MODE register is the "16-bit card" mode, the data is transmitted from the PCI interface block 8 to the 16-bit card interface block 4 (step S28). The 16-bit card interface block 4 transmits the data to the 16-bit PC CARD or 16-bit PC CARD adaptor card, which is connected with the PC CARD connector (step S29).

Figure 7:
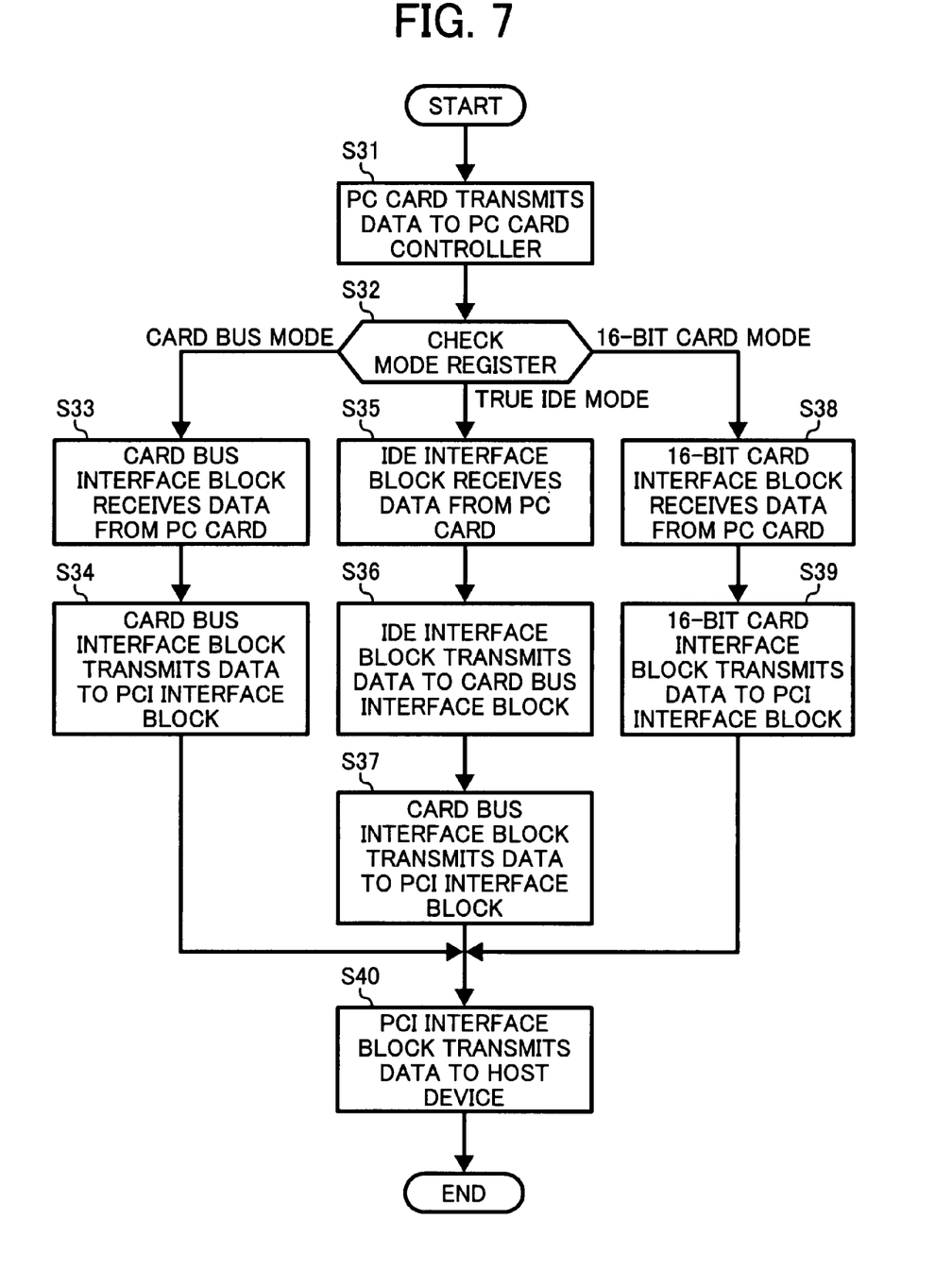
FIG. 7 is a flowchart illustrating the data transfer operation (writing operation) of the card controller used for the system device illustrated in FIGS. 3 and 4.

FIG. 7 is a flowchart illustrating (3) the data transfer

The present invention is not limited to the above-mentioned example, and many changes and modifications can be made thereto.

For example, the above-mentioned example of the PC CARD interface system device uses a PCI bus, but devices such as general-purpose buses and PCI EXPRESS can also be used.

When a PCI bus is used, the DMA transfer method can be used between the PCI and the Card Bus. In this case, a burst operation can be performed between the PCI and the Card Bus, and therefore high speed data transfer can be performed not only between the CF CARD and PC CARD controller but also between the PCI and the PC CARD controller when the True IDE mode of the CF CARD 16 is used in combination therewith.

In the system device illustrated in FIGS. 3 and 4, the IDE interface block 18 and the card identification circuit 20 are mounted in the PC CARD controller 2. However, the configuration is not limited thereto, and the IDE interface block 18 and the card identification circuit 20 can also be built into the PC CARD adaptor card.

Hereinbefore, the present invention has been explained by reference to a PC CARD, a PC CARD adaptor and a CF CARD. Specifically, the present invention can be preferably used for the cases where there are a first memory card, a second memory card different from the first card and an adaptor card for the second card, and a plurality of data transfer modes are provided for each of the two kinds of memory cards, wherein compatibility or invertibility between the data transfer modes of the first memory card and the data transfer modes of the second memory card is not necessarily good.

The present invention is not limited to the cases where memory cards are used, and can be used for the cases where peripheral devices having a plurality of transfer modes are used.

This document claims priority and contains subject matter related to Japanese Patent Application No. 2006-055933, filed on Mar. 2, 2006, incorporated herein by reference.

Having now fully described the invention, it will be apparent to one of ordinary skill in the art that many changes and modifications can be made thereto without departing from the spirit and scope of the invention as set forth therein.

What is claimed is:

1. An interface circuit performing data transfer between a host device and a peripheral device, comprising:
    a first interface block configured to perform data transfer with a host device;
    a 16-bit CARD interface block connected with the first interface block to perform data transfer;
    a Card Bus interface block connected with the first interface block to perform data transfer;
    an IDE interface block connected with the Card Bus interface block to perform data transfer; and
    a card identification circuit configured to access the peripheral device to determine a transfer mode of the peripheral device, wherein the card identification circuit is connected with the 16-bit CARD interface block, Card Bus interface block and IDE interface block,
    wherein the interface circuit determines a mode of the data transfer between the host device and the peripheral device on the basis of the transfer mode of the peripheral device.

2. A system device comprising:
    a host device;
    a peripheral device; and
    the interface circuit according to claim 1 configured to perform data transfer between the host device and the peripheral device.

3. A data interface method for performing data transfer between a host device and a peripheral device through the interface circuit according to claim 1, comprising:
    accessing the peripheral device to determine a transfer mode of the peripheral device;
    determining a mode of data transfer between the host device and the peripheral device according to the transfer mode of the peripheral device; and
    performing data transfer between the host device and the peripheral device according to the mode of data transfer.

4. The system device according to claim 2, wherein when the peripheral device is compatible with a first data transfer mode, the interface circuit uses the first data transfer mode, and when the peripheral device is not compatible with the first data transfer mode, the interface circuit uses a second data transfer mode.

5. The data interface method according to claim 3, wherein the determining step comprises:
    determining a mode of data transfer between the host device and the peripheral device such that when the peripheral device is compatible with a first transfer mode, the first transfer mode is used as the mode of data transfer, and when the peripheral device is not compatible with the first transfer mode, a second data transfer mode is used as the mode of data transfer.

6. The system device according to claim 4, wherein the peripheral device includes a first memory card.

7. The data interface method according to claim 5, wherein the peripheral device includes a first memory card.

8. The system device according to claim 6, wherein the first memory card is a CF CARD, the first transfer mode is a True IDE mode and the second transfer mode is a PC CARD ATA mode.

9. The system device according to claim 6, wherein the peripheral device further includes a second memory card, and wherein the interface circuit further comprises:
    a connector configured to be connected with the second memory card,
    wherein the first memory card is connected with the connector via an adaptor card to perform the data transfer in a transfer mode in which the second memory card is operable.

10. The data interface method according to claim 7, wherein the peripheral device further includes a second memory card, and wherein the accessing step and the data transfer performing step respectively comprise:
    accessing the second memory card via a connector or accessing the first memory card via an adaptor card connected with the connector, and
    performing data transfer between the host device and the peripheral device according to the mode of data transfer via the connector when the second memory card is used as the peripheral device and via the connector and the adaptor card when the first memory card is used as the peripheral device.

11. The system device according to claim 9, wherein when the first memory card, which is connected with the connector via the adaptor card, is compatible with the first transfer mode, the interface circuit informs the host device that the adaptor card is a memory card operable in a third transfer mode, which is compatible with the first transfer mode and in which the second memory card is operable, and when the first memory card, which is connected with the connector via the adaptor card, is not compatible with the first transfer mode, the interface circuit informs the host device that the adaptor card is a memory card operable in a fourth transfer mode in which the second memory card is operable.

12. The system device according to claim 9, wherein the first memory card is a CF CARD, the second memory card is a PC CARD and the adaptor card is a 16-bit PC CARD adaptor card.

13. The data interface method according to claim 10, further comprising:
  informing the host device that the adaptor card is a memory card operable in a third transfer mode, which is compatible with the first transfer mode and in which the second memory card is operable when the first memory card, which is connected with the connector via the adaptor card, is compatible with the first transfer mode and that the adaptor card is a memory card operable in a fourth transfer mode in which the second memory card is operable when the first memory card, which is connected with the connector via the adaptor card, is not compatible with the first transfer mode.

14. The system device according to claim 11, wherein the first memory card is a CF CARD, the second memory card is a PC CARD, the first transfer mode is a True IDE mode, the memory card operable in the third transfer mode is a Card Bus PC card, the memory card operable in the fourth transfer mode is a 16-bit PC CARD, and the adaptor is a 16-bit PC CARD adaptor card.

15. The system device according to claim 12, wherein the interface circuit includes at least three interface blocks, and wherein the data transfer is performed between the host device and the CF CARD via the at least three interface blocks.

16. The system device according to claim 15, wherein the at least three interface blocks include a PCI interface block, a Card Bus interface block, and an IDE interface block.

17. The system device according to claim 16, wherein the interface circuit includes at least four interface blocks, and wherein the at least four interface blocks control a method of connection between the host device and the peripheral device according to the transfer mode identified by the identification circuit.

18. The system device according to claim 17, wherein the connection method includes at least a DMA transfer method.

* * * * *